United States Patent
Büllesfeld et al.

(10) Patent No.: US 11,834,361 B2
(45) Date of Patent: Dec. 5, 2023

(54) DEVICE AND METHOD FOR THE PRODUCTION OF A FLAT GLASS

(71) Applicant: SCHOTT AG, Mainz (DE)

(72) Inventors: Frank Büllesfeld, Kriftel (DE); Doris Moseler, Budenheim (DE); Axel Ohlinger, Wiesbaden (DE); Andreas Langsdorf, Ingelheim (DE); Lothar Willmes, Oestrich-Winkel (DE)

(73) Assignee: SCHOTT AG, Mainz (DE)

(*) Notice: Subject to any disclaimer, the term of this patent is extended or adjusted under 35 U.S.C. 154(b) by 755 days.

(21) Appl. No.: 16/859,769

(22) Filed: Apr. 27, 2020

(65) Prior Publication Data

US 2020/0255316 A1 Aug. 13, 2020

Related U.S. Application Data

(63) Continuation of application No. PCT/EP2018/078441, filed on Oct. 17, 2018.

(30) Foreign Application Priority Data

Oct. 27, 2017 (DE) .................... 10 2017 125 290.8

(51) Int. Cl.
| | |
|---|---|
| *C03B 17/06* | (2006.01) |
| *C03C 3/062* | (2006.01) |
| *C03C 3/064* | (2006.01) |
| *C03C 3/087* | (2006.01) |
| *C03C 3/091* | (2006.01) |
| *C03C 3/093* | (2006.01) |
| *C03C 3/097* | (2006.01) |

(Continued)

(52) U.S. Cl.
CPC .......... *C03B 17/067* (2013.01); *C03B 17/064* (2013.01); *C03C 3/062* (2013.01); *C03C 3/064* (2013.01); *C03C 3/087* (2013.01); *C03C 3/091* (2013.01); *C03C 3/093* (2013.01); *C03C 3/097* (2013.01); *C03C 3/21* (2013.01); *C03C 3/247* (2013.01); *C03B 23/037* (2013.01)

(58) Field of Classification Search
None
See application file for complete search history.

(56) References Cited

U.S. PATENT DOCUMENTS

| | | |
|---|---|---|
| 4,615,989 A | 10/1986 | Ritze |
| 5,227,343 A | 7/1993 | Osuka et al. |

(Continued)

FOREIGN PATENT DOCUMENTS

| | | |
|---|---|---|
| CN | 101028964 | 9/2007 |
| CN | 104024169 | 9/2014 |

(Continued)

OTHER PUBLICATIONS

ISO/WOSA translation as provided by patentscope (Year: 2017).*

*Primary Examiner* — Jodi C Franklin
(74) *Attorney, Agent, or Firm* — Ruggiero McAllister & McMahon LLC

(57) ABSTRACT

The present disclosure provides a device and a method with which flat glasses with particularly uniform thickness can be obtained. The methods are drawing methods in which a glass ribbon is drawn. In the method an aperture is used which allows a defined very small slit between the glass ribbon and the aperture also in the case of a change of the position of the glass ribbon.

5 Claims, 11 Drawing Sheets

(51) Int. Cl.
*C03C 3/21* (2006.01)
*C03C 3/247* (2006.01)
*C03B 23/037* (2006.01)

(56) References Cited

U.S. PATENT DOCUMENTS

| | | | | |
|---|---|---|---|---|
| 5,750,448 | A | 5/1998 | Grabowski et al. | |
| 8,176,753 | B2* | 5/2012 | Kahlout | C03B 17/064 65/193 |
| 8,528,365 | B2* | 9/2013 | Delia | C03B 17/064 65/157 |
| 8,899,078 | B2* | 12/2014 | Zhou | C03B 17/068 65/195 |
| 8,931,309 | B2* | 1/2015 | Abdul-Rahman | C03B 17/061 65/203 |
| 8,938,992 | B2* | 1/2015 | Kariya | C03B 17/067 65/195 |
| 9,512,025 | B2* | 12/2016 | Chung | C03B 17/068 |
| 11,427,493 | B2* | 8/2022 | Christopher | C03B 17/067 |
| 2001/0039814 | A1* | 11/2001 | Pitbladdo | C03B 17/064 65/195 |
| 2003/0121287 | A1* | 7/2003 | Chalk | C03B 17/064 65/195 |
| 2003/0181302 | A1* | 9/2003 | Kaiser | C03B 35/185 492/40 |
| 2004/0093900 | A1 | 5/2004 | Fredholm | |
| 2010/0126226 | A1* | 5/2010 | Zhou | C03B 17/068 65/158 |
| 2011/0100056 | A1* | 5/2011 | Anderson | C03B 17/068 65/181 |
| 2012/0302063 | A1* | 11/2012 | Markham | B24B 1/00 438/692 |
| 2013/0047671 | A1* | 2/2013 | Kohli | C03B 25/093 65/83 |
| 2014/0238077 | A1* | 8/2014 | Anderson | C03B 17/067 65/355 |
| 2015/0315066 | A1 | 11/2015 | Wolff et al. | |
| 2016/0052819 | A1* | 2/2016 | Kawaguchi | C03B 17/067 428/141 |
| 2016/0156065 | A1* | 6/2016 | Visco | H01M 10/0562 65/106 |
| 2016/0176746 | A1* | 6/2016 | Hunzinger | C03B 23/02 65/53 |
| 2017/0225994 | A1* | 8/2017 | Buellesfeld | C03B 17/064 |
| 2017/0334773 | A1 | 11/2017 | Katayama | |
| 2017/0345699 | A1 | 11/2017 | Katayama | |
| 2018/0226311 | A1 | 8/2018 | Katayama | |
| 2019/0062200 | A1* | 2/2019 | He | C03C 3/083 |
| 2019/0375668 | A1* | 12/2019 | Bookbinder | C03C 3/083 |

FOREIGN PATENT DOCUMENTS

| | | |
|---|---|---|
| CN | 104944747 | 9/2015 |
| DE | 2717238 | 11/1978 |
| GB | 827488 | 2/1960 |
| JP | 2003171129 | 6/2003 |
| JP | 2014-517805 | 7/2014 |
| JP | 2016056060 | 4/2016 |
| JP | 2016-124758 | 7/2016 |
| JP | 2016-147770 | 8/2016 |
| JP | 2017114711 | 6/2017 |
| JP | 2017186227 | 10/2017 |
| JP | 2020523250 | 8/2020 |
| WO | 2012166446 | 12/2012 |
| WO | 2016047210 | 3/2016 |
| WO | 2016057590 | 4/2016 |
| WO | 2016085778 | 6/2016 |
| WO | 2016088868 | 6/2016 |
| WO | 2017002626 | 1/2017 |
| WO | 2017095791 | 6/2017 |

* cited by examiner

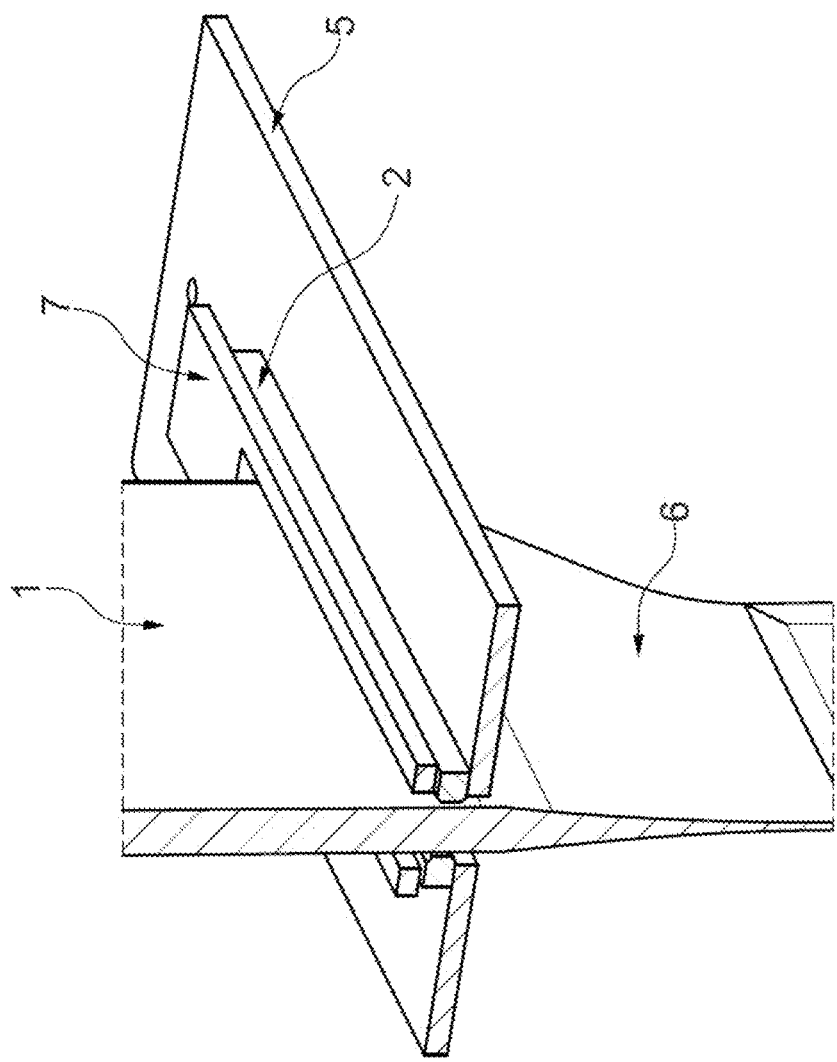

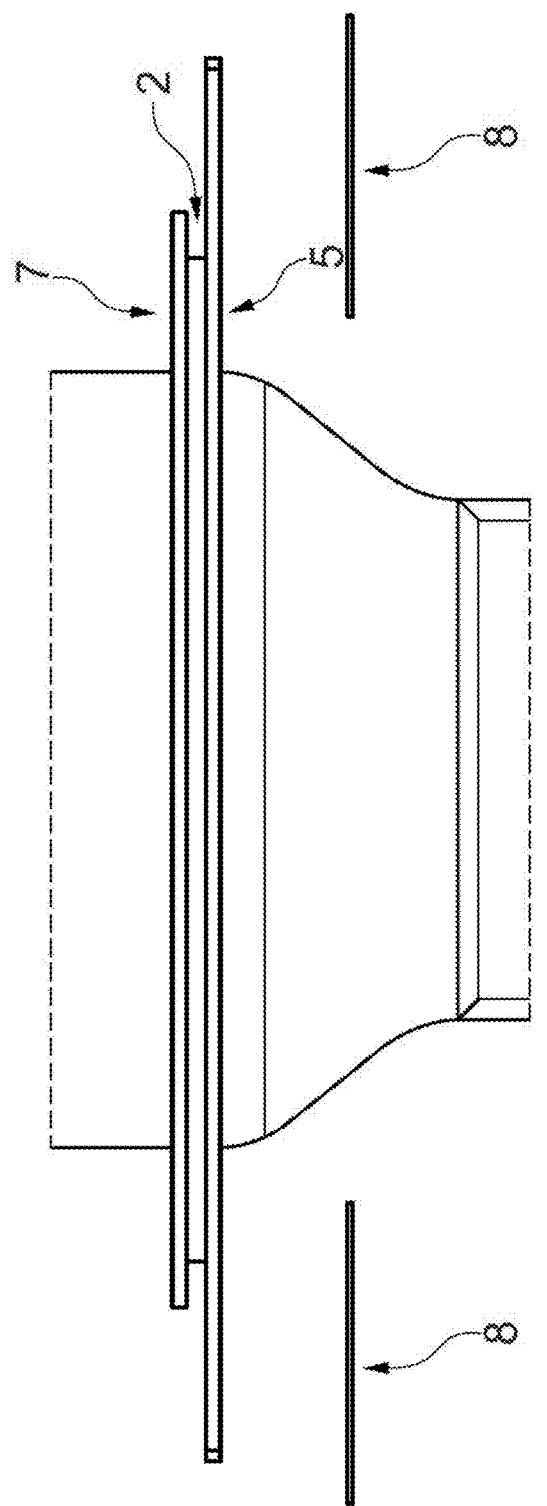

DEVICE AND METHOD FOR THE PRODUCTION OF A FLAT GLASS

CROSS-REFERENCE TO RELATED APPLICATION

The present application is a continuation of International Patent Application No. PCT/EP2018/078441, filed on Oct. 17, 2018, which in turn claims the benefit of German Patent Application No. 10 2017 125 290.8, filed on Oct. 27, 2017, each of which is herein incorporated by reference.

BACKGROUND OF THE DISCLOSURE

1. Field of the Disclosure

The present disclosure relates to devices and methods for the production of flat glasses as well as flat glasses.

2. Description of the Related Art

Flat glasses according to the present disclosure are thin glasses which are, for example, suitable for the production of OLED covers, optical filters and other optical components, MEMS, substrates for sensors, displays or cover glasses. Such glasses are prepared by drawing methods. The thinner a glass, the more difficult to obtain a flat glass having a uniform thickness—thus a low total thickness variation (TTV). One reason for the nonuniformity of the thickness of a glass product can be found in temperature fluctuations during the hot forming. The viscosity of a glass depends on the temperature so that fluctuations of the temperature result in fluctuations of the viscosity. Fluctuations of the viscosity of a glass body during the drawing process result in a high TTV.

In some devices, with different measures it has been tried to produce flat glasses with an especially low TTV. For this purpose, also apertures which separate a region of hot forming from the surroundings as far as possible have been used (cf. WO 2017/095791 A1, WO 2012/166446 A1). Apertures have also been used for avoiding the penetration of dirt into the region of hot forming (cf. WO 2016/085778 A1).

An important property of flat gasses for the above-mentioned fields of application is a flawless surface. The surfaces of flat glasses which can be prepared in drawing methods such as in particular down draw, overflow fusion and redraw, are characterized by particularly flawless properties. These are so-called "fire-polished" surfaces. For protecting these flawless surfaces, any contact of parts of the devices with the drawn glass ribbon is avoided. Therefore, in prior art always relatively large aperture openings have been provided for excluding an undesired contact between the aperture and the glass ribbon.

It is the object of the present disclosure to provide devices and methods with which flat glasses can be obtained, wherein the uniformity of their thickness exceeds those of current glasses.

SUMMARY OF THE DISCLOSURE

The present disclosure includes a method for the production of a flat glass with at least two fire-polished surfaces. A hot forming zone is provided in which the glass of a glass ribbon passes through a temperature range comprising the processing temperature $V_a$ of the glass. For thermal separation of the gas compartments between a region where the glass of the glass ribbon is at its processing temperature $V_a$ and a region in which the glass is at its transformation temperature Tg, a frame or faceplate is provided. The frame or faceplate has an opening through which the glass ribbon can be moved. On at least one point each on at least two sides of the glass ribbon, projections, or contact sections of the frame or faceplate touch the hot glass ribbon.

Preferably, according to the present disclosure, the method comprises a step of forming, in which by the action of a drawing force onto a formable glass section of a glass ribbon, a thin glass ribbon is obtained. Preferably, a hot forming zone is provided in which the glass passes through a temperature range that is at or about the processing temperature $V_a$ of the glass. Preferably, the hot forming zone comprises at least one frame or faceplate for the thermal separation of the gas compartments of the hot forming zone, wherein the frame or faceplate has an opening through which the glass ribbon can be moved and the walls or contact sections of the frame or faceplate touch the glass ribbon on at least one point each on at least two sides.

In the present disclosure, a "flat glass" is a glass body, in which the width and length of it are substantially larger than its thickness. According to the present disclosure, the thickness is preferably lower than 5 mm, more preferably lower than 2 mm, further preferably lower than 1 mm, more preferably lower than 750 µm, further preferably lower than 500 µm and particularly preferably lower than 250 µm. The width is preferably at least 100 mm, further preferably at least 200 mm, more preferably at least 300 mm and particularly preferably at least 400 mm. In principle, the length is not subject to any limitation, because with many drawing methods very long glasses can be produced. Typically, the length is higher than 100 mm, preferably higher than 250 mm and particularly preferably higher than 500 mm. Flat glasses according to the present disclosure may have rectangular base areas, but also round or arbitrarily shaped flat glasses are included in the present disclosure.

In the method according to the present disclosure, in particular from a glass ribbon a thinned glass ribbon is obtained. Here, a glass ribbon may have any arbitrary shape. In the context of a redrawing method the term "glass ribbon" comprises the so-called preform which in the course of the forming step is drawn to a glass ribbon that is thinner than at the beginning of the process. In the context of a down draw or overflow fusion method the glass ribbon is the glass melt which at first after the exit from the slit-shaped drawing vat (down draw) or flowing together at the end of the drawing vat (overflow fusion) or below the drawing vat (new down draw) is still liquid. The thinned glass ribbon is the product of the hot forming step before optional postprocessing steps, in particular before cutting and/or before the removal of the bulb edges.

In one embodiment, the present disclosure provides a method for the production of a flat glass with at least two fire-polished surfaces. The method comprises the steps of: passing a glass through a forming device that has a first region, wherein the glass is at a transformation temperature Tg of the glass in the first region; passing the glass through a second region of the forming device, wherein in the second region, the glass is at a temperature that is within a temperature range that encompasses a processing temperature $V_a$ of the glass; and passing the glass through a faceplate of the forming device, wherein the faceplate is between the first region and the second region, wherein the faceplate thermally separates the first region and the second region. The glass has four sides, and the faceplate comprises projections that contact the glass on at least one point on each of at least two sides of the glass.

BRIEF DESCRIPTION OF THE DRAWINGS

FIG. 2 shows a perspective view of a frame or faceplate arrangement in a device according to the present disclosure.

FIG. 3 shows a schematic side view of a frame or faceplate arrangement in a device according to the present disclosure.

DETAILED DESCRIPTION OF THE DISCLOSURE

The embodiments of the disclosure which are explained below are for illustration and do not limit the subject matter of this disclosure.

Figure 1A:
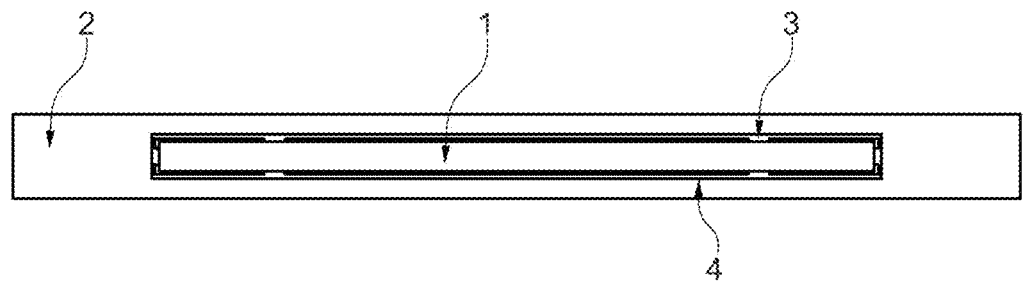
FIG. 1A shows a frame or faceplate arrangement in a device according to the present disclosure with a glass body being located therein in top view.
Figure 1B:
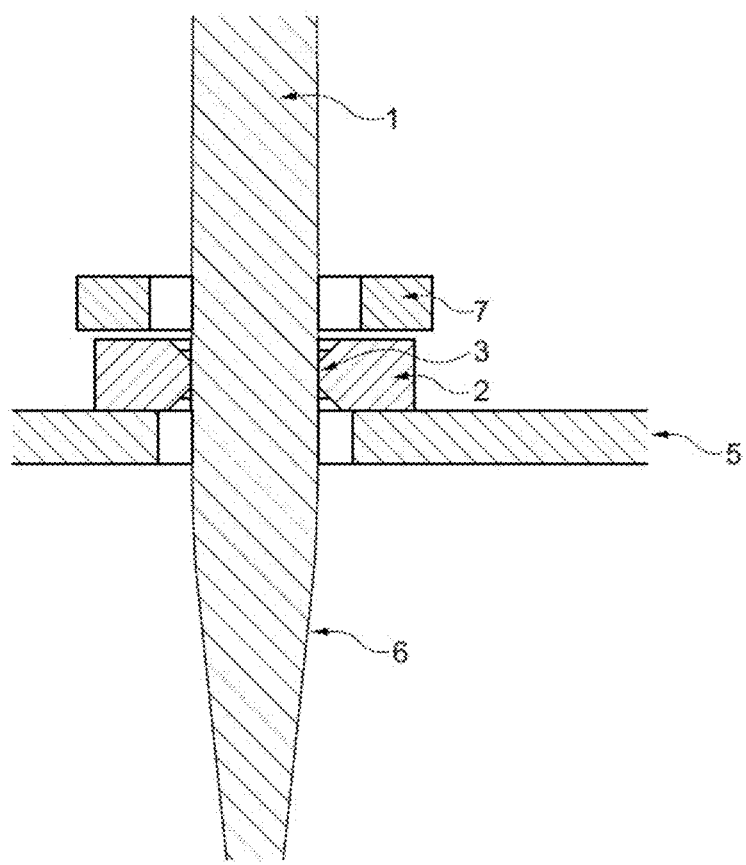
FIG. 1B shows a lateral sectional view of the frame or faceplate arrangement of FIG. 1A.

Referring to the Figures, and in particular FIGS. 1A, 1B and 2, one embodiment of the disclosure is shown. The true frame or faceplate (which can be made of hexagonal boron nitride) lies on a supporting plate having a larger opening than an opening in the frame or faceplate. The frame or faceplate may slip on the supporting plate and thus may be able to position itself with respect to the glass ribbon. In this design the frame or faceplate comprises six projecting contact sections in the form of guide noses, wherein it is possible that they touch the glass. Here, the guide noses are provided with slopes sloping into the direction of the glass ribbon to allow the glass ribbon to push the frame or faceplate into the correct position.

FIG. 1A shows a glass ribbon 1 in the opening of frame of faceplate 2 (herein after "faceplate" for ease of description). Faceplate 2 comprises projections or contact sections 3 (hereinafter "contact sections" for ease of description) which touch the glass ribbon 1. The contact sections 3 have the form of guide noses. Two guide noses each touch the upper side and the lower side of the glass ribbon 1, and one guide nose each touches both smaller sides. There, where the faceplate 2 does not touch the glass ribbon 1, a slit is formed between the glass ribbon 1 and faceplate 2. Faceplate 2 as shown is formed in one, integral part. The present disclosure also contemplates faceplates 2 that are formed in several parts.

FIG. 1B shows a faceplate 2 of the same kind as shown in FIG. 1A. The faceplate 2 comprises contact sections 3 designed as guide noses. The contact sections 3 are sloped into the direction of flow of glass ribbon 1. The arrangement, in addition, comprises a cover plate 7. The faceplate 2 lies on a base plate 5 which is a part of a housing of the hot forming zone 6.

FIG. 2 also shows a glass ribbon 1, when it enters a hot forming zone 6. The device shown comprises a housing which comprises a base plate 5 for the faceplate 2 and the cover plate 7 being arranged on the faceplate 2.

FIG. 3 shows an embodiment similar to FIG. 2 and illustrates the arrangement of the thermocouple elements 8 for the determination of the temperature distribution in the hot forming zone. The temperature of the hot zone is measured below the faceplate 2, when several heaters are provided, between the heaters. For the measurement a thermocouple element of type K with a wire diameter of 0.1 mm and a pearl diameter of smaller than 0.3 mm is used. The sampling rate of the measurement is one second. This setup is characterized by a low thermal inertia and allows the measuring of the fluctuations of the air temperature in the deforming zone.

Figure 4A:
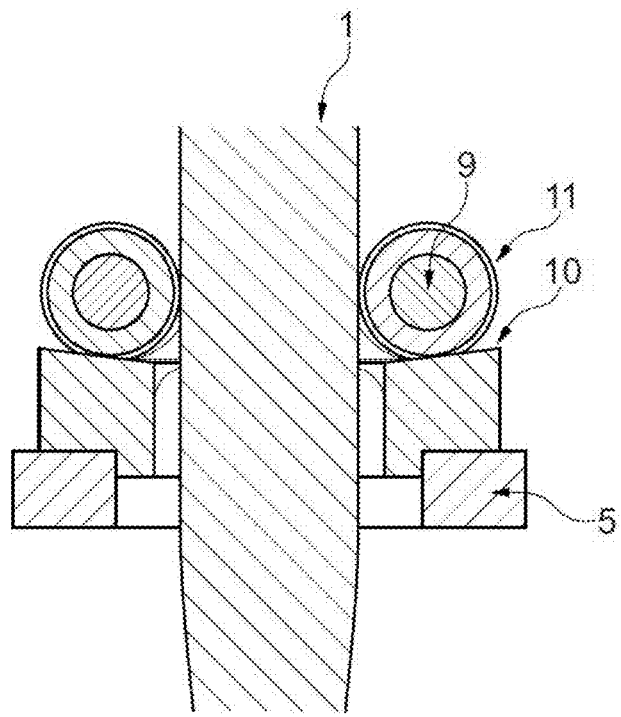
FIG. 4A shows a frame or faceplate arrangement in a device according to the present disclosure in a lateral sectional view.
Figure 4B:
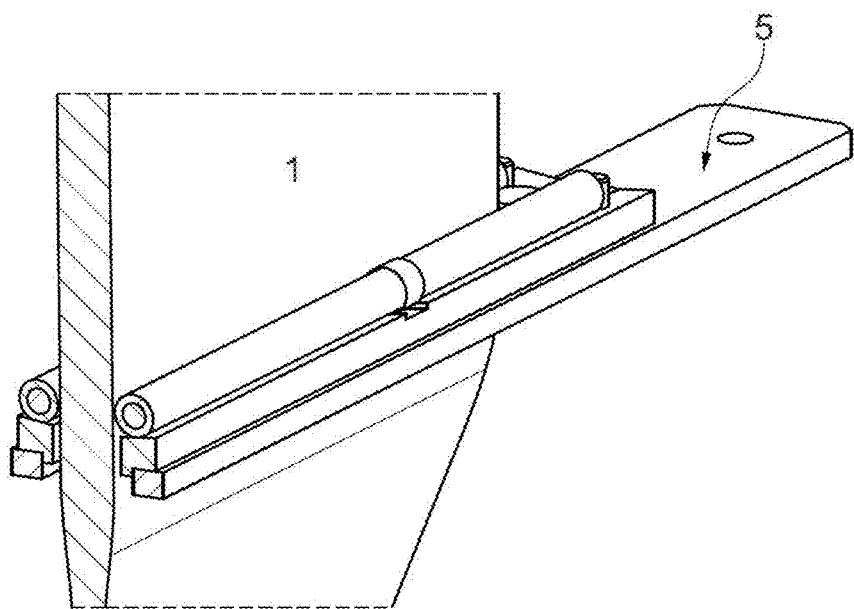
FIG. 4B shows a perspective sectional view of a device with a frame or faceplate arrangement according to the present disclosure.
Figure 5A:
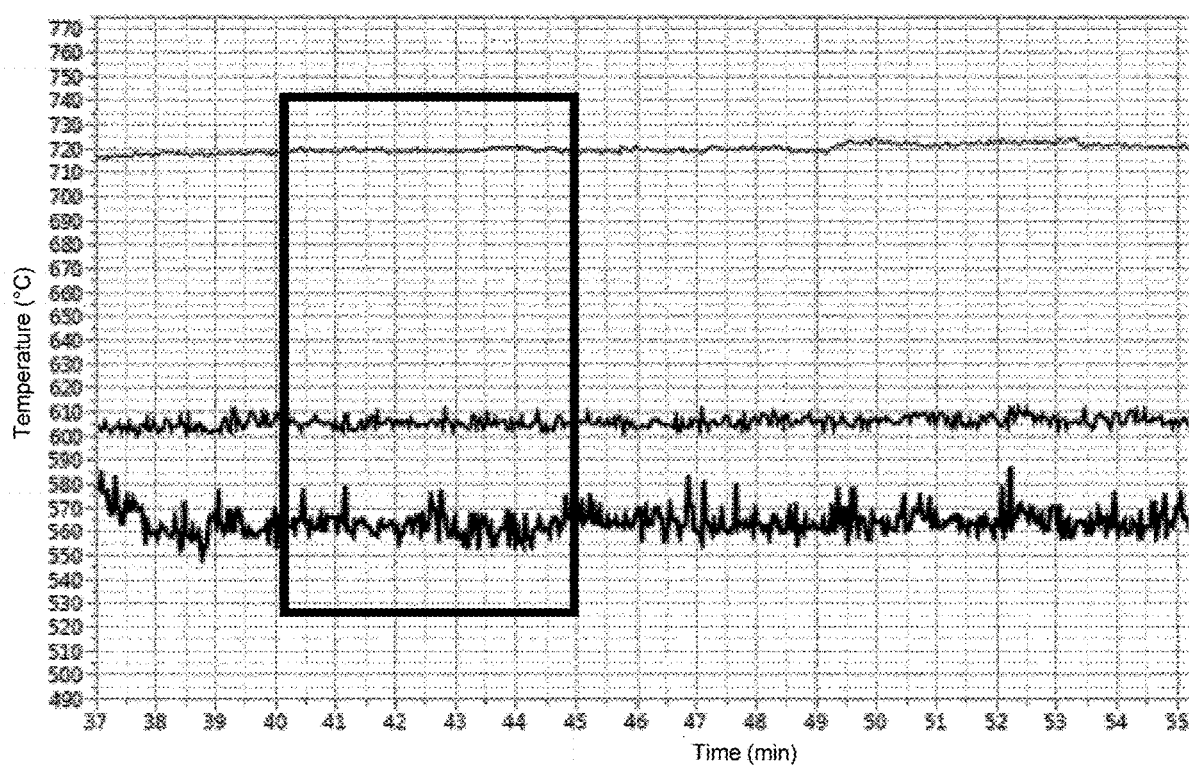
FIGS. 5A-D show measuring data for the temperature distribution in a method according to the present disclosure.
Figure 5B:
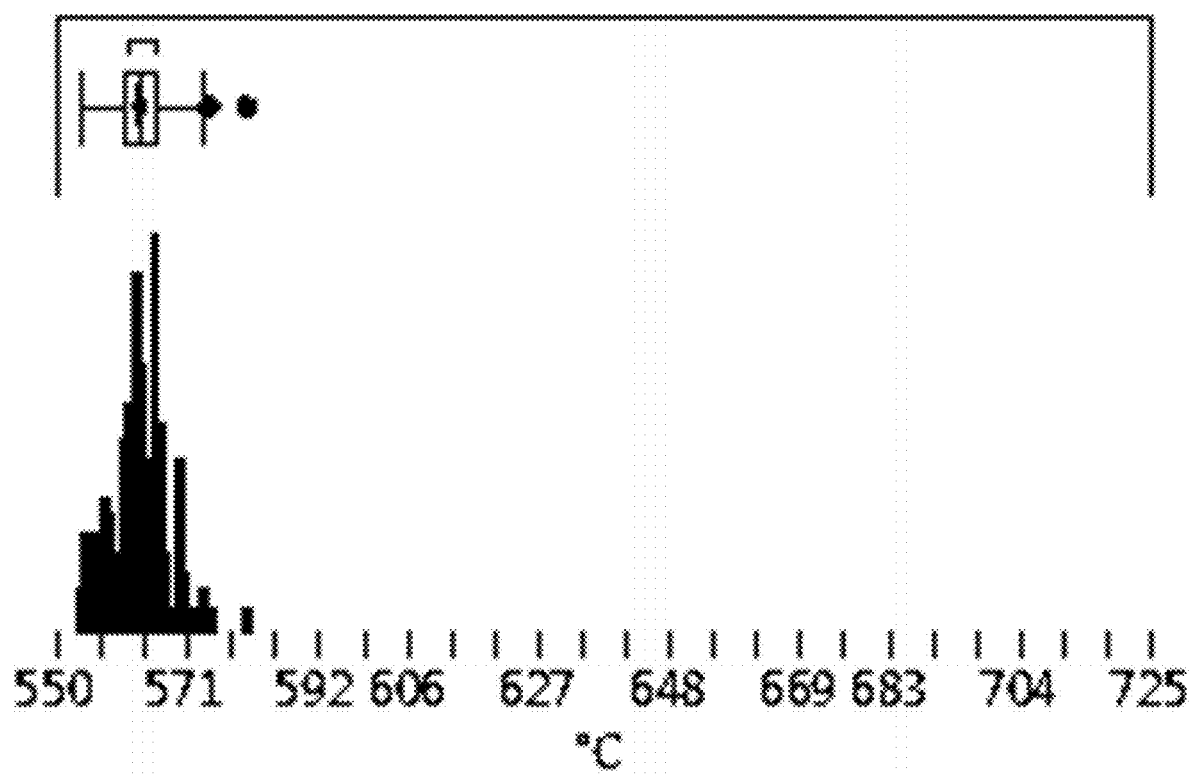
Figure 5C:
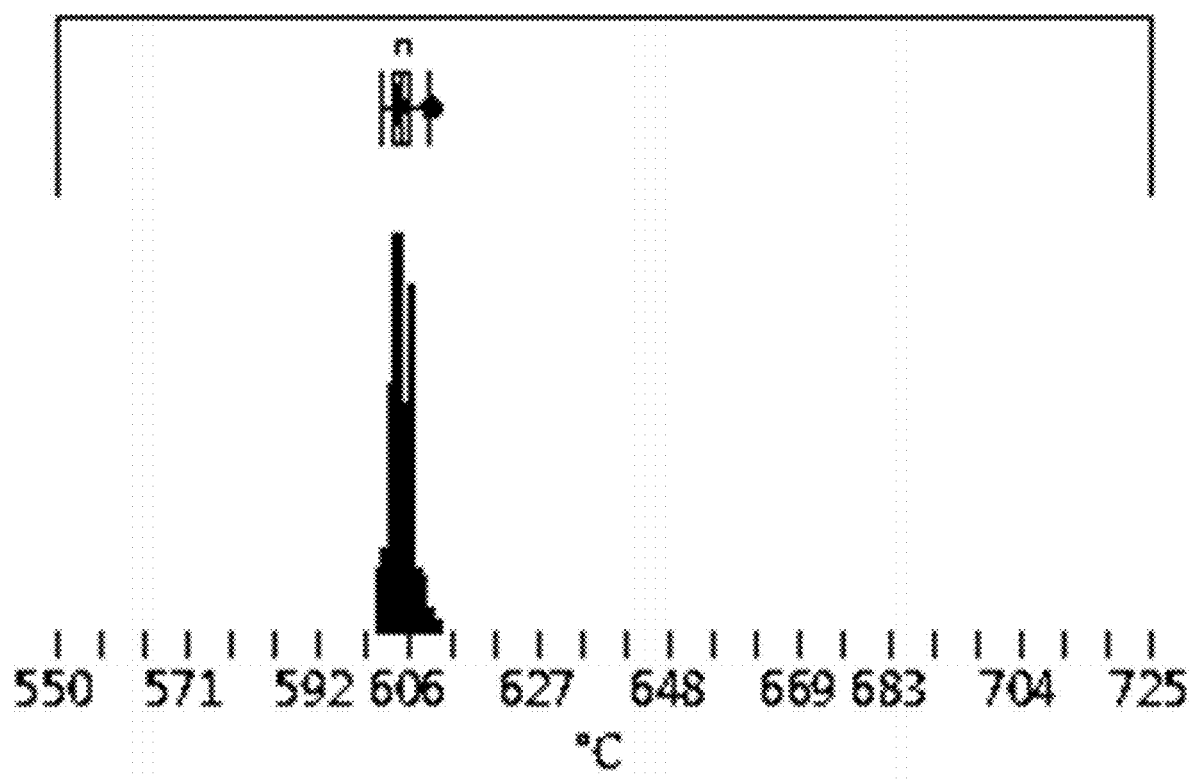
Figure 5D:
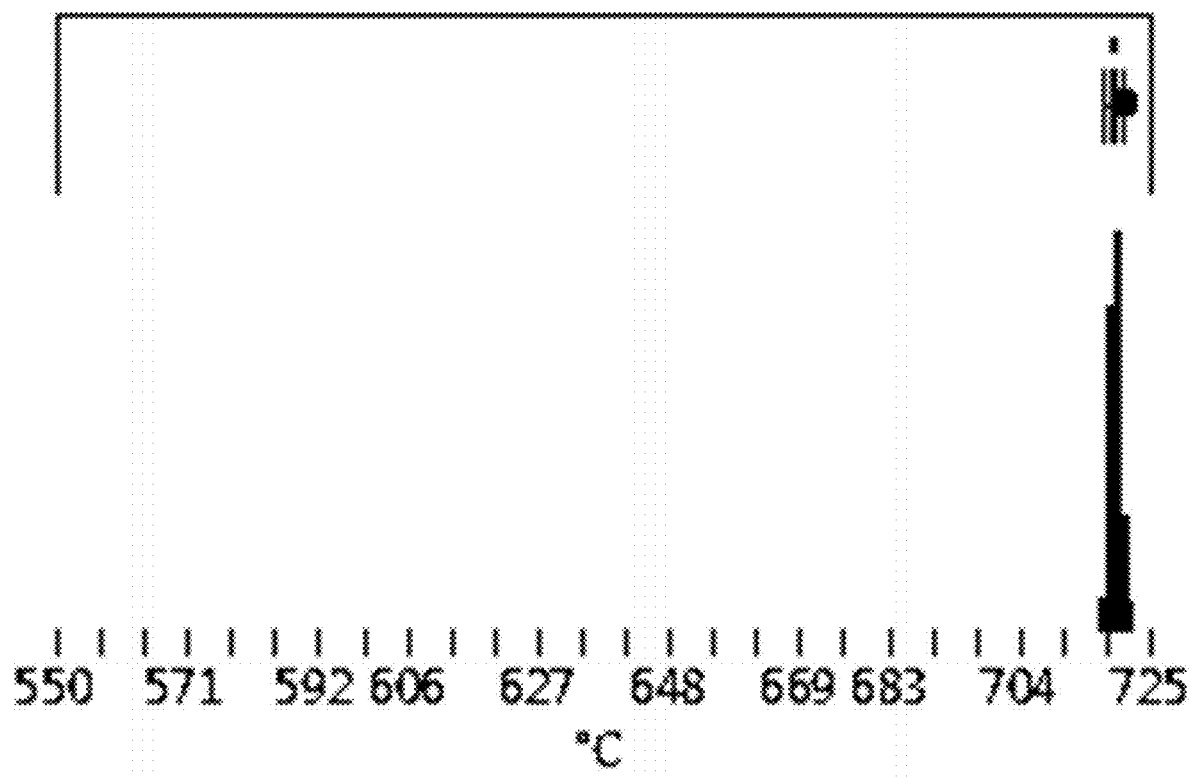

FIGS. 4A and 4B show an additional embodiment. This embodiment has the advantage that on both sides of the glass ribbon the same slit sizes result. Round small tubes or rods made of heat-resistant material (aluminum oxide, fused silica, silica glass, etc.) lie on slopes that are inclined toward the direction of the glass ribbon flow. So, they roll into the direction of the glass. These small tubes are provided with contact sections in the form of spacers made of glass contact material (e.g. hexagonal boron nitride) so that a defined slit can be adjusted. Here, the spacers are positioned such that the region of the glass ribbon which is downflow from the net region is not touched. The net region is the proportion of the glass ribbon which is used for the final product without the above described edges.

FIG. 4A shows an alternative design of the device with an arrangement according to the present disclosure. Here, a cylindrical element 9 is used which is arranged on a support 10 with a slope into the direction of the glass ribbon 1. The support 10 in turn is arranged on a base plate 5 which may be a constituent of a housing of the hot forming zone. The cylindrical element 9 comprises contact sections 11, wherein they are designed as regions of the cylindrical element 9 with increased diameter. FIG. 4B also shows a device with cylindrical elements.

In particularly preferable embodiments the method according to the present disclosure is a redrawing method and the glass ribbon is the preform. In this case the preform is drawn from a starting thickness D and starting width B to a target thickness d and a target width b. During the drawing method the glass becomes thinner so that d is much smaller than D. The width B decreases to a minor degree than the thickness D. Thus, the following is true: D/d is higher than B/b.

The processing temperature $V_a$ is the temperature at which the glass of which the glass ribbon has a viscosity of $10^4$ dPas. The softening point EW is the temperature at which the glass of which the glass ribbon consists has a viscosity of $10^{7.6}$ dPas. The transformation temperature Tg is the temperature at which the glass has a viscosity of $10^{13}$ dPas.

According to the present disclosure, the preferably substantially horizontally arranged faceplate touches the glass ribbon on at least two sides. So, it is achieved that the distance of the faceplate to the glass ribbon during the method remains constant and that the gas compartments above and below the faceplate are nearly completely separated. This results in the fact that the vertical convection between both gas compartments is limited and thus the temperature fluctuations are low. During the production process a glass ribbon and in particular a thinned glass ribbon, has the tendency to slightly change its position. On the one hand, a reason for that is that with the drawing methods which are used here very thin glass ribbons can be produced, wherein the position of them can already be influenced by air movement. On the other hand, the devices which are used in these methods are normally at least partially built from metal which under the influence of heat expands quite strongly. So, this results in a change of the position of the glass ribbon in the device. In the case of redrawing methods which are preferred in the context of the present disclosure, an additional point is that the absolute fluctuations of the thickness of the preform can be remarkable so that for an faceplate between a preheating zone and a hot forming zone these fluctuations have to be considered. In prior art, it was necessary that the size of the opening which has enabled the entry and/or exit of the glass body into and from the hot forming zone was selected large enough for allowing these changes of the position without colliding interactions between the glass ribbon and the faceplate. With the solution according to the present disclosure, a uniform distance between the walls of the opening in the faceplate and the glass ribbon is guaranteed.

In an embodiment, the contact sections of the faceplate touch the glass ribbon exactly on two sides. The sides which are touched by the contact sections are in particular the sides with the largest surfaces which here are referred to as upper side and lower side. For this purpose, the faceplate may comprise contact sections which touch the sides of the glass ribbon. Here, a contact section is a constituent of the faceplate which projects beyond distance sections and in particular all other constituents of the faceplate in the direction of the glass ribbon and thus can come into contact with the glass ribbon without any contact between further parts of the faceplate and the glass ribbon. Contact sections can be manufactured from any material which withstands the high temperatures of the glass and does not result in a contamination of the glass. A preferable material for the contact sections is hexagonal boron nitride, aluminum oxide, fused silica, silica glass or a combination thereof.

In one embodiment, the faceplate comprises two or more contact sections each for the upper side and the lower side of the glass body. In an alternative or in addition, the faceplate may comprise one or more contact sections each for both small sides of the glass ribbon passing through the faceplate opening. In one embodiment, the faceplate comprises six contact sections, two for the upper side and the lower side each and one each for each small side. Contact sections may be components projecting into the direction of the glass ribbon which basically may have an arbitrary shape and which preferably may be sloped (guide noses), wherein this means that the contact section comprises at least one face sloping into the direction of the glass ribbon.

In an alternative embodiment, the faceplate may comprise cylindrical constituents such as rollers, tubes, or rods, wherein contact sections are in particular formed by regions of such a faceplate constituent having a higher cylinder diameter. In this embodiment, distance sections are preferably formed by regions having a cross-section diameter which is lower than in the region of a contact section. In this design, the width of the slit between the glass ribbon and the distance section is in particular the half of the difference between the cross-section diameter in the region of the contact sections and the cross-section diameter in the region of the distance sections. A cylindrical design has the advantage that the cylinder(s) abut(s) upon the glass ribbon in a roll-like fashion and thus result(s) in a particularly low resistance, because in the case of movement of the glass ribbon they roll on its surface. The cylindrical constituents may be arranged on a support having a slope into the direction of the glass ribbon so that always a minimum slit width is achieved. This design makes it possible that the cylindrical constituents always are correctly positioned without any necessity for an intervention into the production flow.

The contact area with which the contact sections touch the glass ribbon is preferably as small as possible. In particular, the dimension of the contact area in the direction of the width of the glass ribbon per contact section is lower than 10 cm, preferably lower than 5 cm, more preferably lower than 2 cm or lower than 1 cm. In particularly preferable embodiments, the dimension in the width direction per contact section is not higher than 0.5 cm or even not higher than 0.3 cm. The dimension in the direction of the length of the glass ribbon per contact section is preferably lower than 10 cm, in particular lower than 5 cm, more preferably lower than 2 cm or lower than 1 cm. In particularly preferable embodiments, the dimension in the length direction per contact section is not higher than 0.5 cm or even not higher than 0.3 cm. The smaller the contact area, the lower the resistance of the contact section against the drawing movement.

Preferably, the contact sections of the faceplate touch the glass ribbon on its edges, in particular in a region extending from the edges of the glass ribbon over a width which corresponds to at most 30% or at most 20%, preferably at most 15%, more preferably at most 10% or at most 5% of the whole width of the thinned glass ribbon each. The edges of the glass ribbon are discarded in drawing methods in which a particularly high surface quality and a particularly high uniformity of the thickness are a target, because they in comparison to the middle section of the glass ribbon are characterized by a higher thickness (bulb edge). This is the reason, why the contact of constituents of the faceplate with the glass ribbon in these regions can be accepted, particularly in view of the fact that the improvement of the TTV of the flat glasses which are prepared with the methods according to the present disclosure is extremely distinct. The edges of the thinned glass ribbon can be removed in a postprocessing step. So, it is preferable that the contact sections touch the glass ribbon outside the net region.

Preferably, the faceplate comprises contact sections and distance sections. Preferably, contact sections of the faceplate touch the glass ribbon and the faceplate comprises distance sections which do not touch the glass body and which form a slit between the glass ribbon and the distance sections of the faceplate, wherein the slit has preferably a width of at most 5 mm, in particular at most 4 mm, preferably at most 3 mm, more preferably at most 2 mm. In a particularly preferable embodiment, the slit is <2 mm, more preferably <1 mm, particularly preferably <0.5 mm or even <0.1 mm. The width of the slit is the horizontal distance between the glass ribbon and the distance section of the faceplate. A particularly small slit between the distance sections and the glass ribbon reduces the convection and results in a particularly sharp temperature gradient between the hot forming zone and regions outside the hot forming zone beyond the faceplate. Reduced convection allows particularly small TTVs. Sharp temperature gradients allow the execution of the method with particularly short hot forming zones which counteracts the width contraction of the glass ribbon and thus increases the yield.

In an embodiment, the method is a down draw or an overflow fusion method. In preferable embodiments, in particular in the case of a design of the method as a down draw or overflow fusion method, a faceplate is arranged at a glass outlet opening of a housing of the hot forming zone. An faceplate at the glass outlet opening which is located in the drawing direction of the hot forming zone thermally shields the region below the hot forming zone so that the glass ribbon already a short time after leaving the hot forming zone can be cooled in a controlled manner. So, for example, a particularly fast cooling can be realized. Of course, this may also be an advantage for redrawing methods.

In preferable embodiments, the method according to the present disclosure is a redrawing method. Especially the redrawing methods profit from the design of the faceplate according to the present disclosure, because redrawing methods require a holder for the preform which normally comprises metal elements which under the influence of heat expand and thus change the position of the preform. The design of the faceplate according to the present disclosure may be helpful in dealing with these position changes.

In preferable designs of the method, a faceplate is arranged at a glass inlet opening of a housing of the hot forming zone, in particular between a zone in which the glass has its transformation temperature Tg and the hot forming zone. The arrangement of the faceplate at the glass inlet opening is particularly preferable for redrawing methods. In the context of redrawing methods, preferably, the preform before the entry into the hot forming zone is preheated in a preheating zone. In the preheating zone, the glass is in particular heated to a temperature which is below the temperature in the hot forming zone and in particular below the processing temperature, but above the transformation temperature. For achieving a uniform hot forming only in the hot forming zone by effective thermal separation of the hot forming zone from the preheating zone, the use of the faceplate described herein has proved its worth.

The drawing force which is preferably exerted during the method onto a formable glass section of the glass ribbon according to the present disclosure is preferably at least 1 N, in particular at least 5 N or at least 10 N. A minimum drawing force is preferable for sufficiently deforming the glass ribbon. The required drawing force depends on the viscosity of the glass at the chosen temperature. When the glass is drawn with a drawing force which is too high, then the desired glass thickness is not obtained, and it is possible that the glass ribbon tears. Therefore, the maximum drawing force is preferably limited to 400 N, in particular 200 N and particularly preferably 100 N.

In preferable embodiments of the method, the uniformity of the temperature in the hot forming zone is characterized by an interquartile range of less than 2 K, more preferably less than 1.5 K and particularly preferably less than 1 K. It has been shown that the adjustment of such a low interquartile range results in the low TTV which is desired according to the present disclosure. For the determination of the interquartile range the temperature in the hot forming zone is measured with a thermocouple element, in particular with a quickly responsive thermocouple element. For this purpose, the thermocouple elements which are used in the example part are suitable. They are characterized by wire gauges of lower than 0.1 mm and pearl diameters of <0.3 mm. Temperature sensors with a low thermal inertia can be used. In particular such sensors which after a transfer from an oven with a temperature of 600° C. into ambient air with a temperature of 20° C. cool with an initial cooling rate of higher than 5 K/s.

In this case, the thermocouple elements are arranged in the glass plane with a distance to the faceplate of less than 40 mm and a distance to the glass rim of less than 20 mm. In an alternative, the thermocouple elements may also be arranged in the glass ribbon plane in the middle of the deforming zone and with a distance to the glass rim of less than 20 mm. But also any other position in the deforming zone of the glass ribbon with a distance to the glass ribbon of less than 20 mm is possible.

In a preferable design of the method, a faceplate can be moved at least section by section relative to a housing of the hot forming zone. In prior art, apertures are normally permanently linked with the drawing device, such as for example a housing of a hot forming zone. With the design of an faceplate which can be moved relatively with respect to a housing of the hot forming zone which is preferable according to the preset disclosure it becomes possible always to achieve an optimum orientation of the faceplate so that it is possible to produce flat glasses with excellent quality. For example, it may be possible that the faceplate is slidable on a plate or can be slipped on a plate and can be pushed into the required position so that the faceplate quasi follows the movement of the glass ribbon without any change of the width of the slit. The plate may be a part of a housing of the hot forming zone.

Device

Features which are described in the above description of the method and which are reflected in device features are preferably also features of the device, also, when they are not again described below. The device is in particular suitable and intended for conducting the method according to the present disclosure and for the production of the flat glass according to the present disclosure.

The disclosure includes a device for the production of a flat glass with at least one glass reservoir, at least one hot forming zone, at least one drawing facility which is suitable for exerting a drawing force onto a glass ribbon in the device, wherein the hot forming zone comprises at least one faceplate for the thermal separation of the gas compartments of the hot forming zone, wherein the faceplate has an opening through which the glass ribbon can be guided, and the faceplate comprises contact sections which are designed for touching the glass ribbon on at least one point each on at least two sides. Preferably, the device is a redrawing device, a down draw device or an overflow fusion device.

A "faceplate" is any component which is able to cause a thermal separation between the hot forming zone and the region above and/or below it. It may consist of one or several parts. In preferable designs the faceplate comprises distance sections which are arranged with a distance to the glass ribbon so that between the glass ribbon and the distance section a slit is formed. Preferably, a faceplate can be moved at least section by section relative to a housing of the hot forming zone. Particularly preferable is a design, wherein the faceplate comprises one or several, in particular two, cylindrical constituents, in particular rollers, which are arranged on a support, and wherein the support comprises a slope into the direction of the glass ribbon.

Preferably, a faceplate is arranged at a glass outlet opening of a housing of the hot forming zone and/or a faceplate is arranged at a glass inlet opening of a housing of the hot forming zone. In preferable embodiments at both openings, the inlet opening into the hot forming zone and also the outlet opening from the hot forming zone, faceplates of the herein described kind are arranged for adjusting a temperature distribution which is as uniform as possible and thus an interquartile range which is preferable according to the present disclosure.

Preferably, the drawing facility comprises guiding means. The guiding means are preferably rollers, crawlers, rolls, grippers or a combination thereof. Preferably, the guiding means have a cylindrical basic shape. In particular, the guiding means comprise at least one contact area with which the guiding means is in contact with the glass ribbon. Preferably, the device comprises a heating facility for heating the glass ribbon. Preferably, the heating facility is selected from resistance heater, IR heater, burner and laser as well as combinations thereof. In a preferable embodiment the device comprises a cooling facility for cooling the glass ribbon after the deformation.

There is a distance between the heating facilities and the glass. The space which results from this distance is filled with a gas, generally with air, and is called gas compartment herein. In this gas compartment due to temperature gradients convection currents are generated. However, it is not a prerequisite for a gas compartment that heating facilities are present. The term "gas compartment" rather means that the glass is not located in vacuum, but in a space which is filled with gas (in particular with air) so that it is possible that convection currents are generated. This gas compartment can be limited by heating facilities or in another way. For the present disclosure, it is particularly important that the gas compartments above and below the faceplate are thermally separated by the faceplate so that the vertical convection between both gas compartments is restricted and thus the temperature fluctuations are low.

In one embodiment, the device is a redrawing device in which the glass reservoir, hence, is formed from a preform of the glass and/or the device comprises a holder for a preform of the glass. In another embodiment the device is a down draw or overflow fusion device in which the glass reservoir is formed from a drawing vat. In the case of a down draw device the drawing vat comprises a slot nozzle on its lower end. The device may comprise one or several guiding bodies in the region below the slot nozzle.

Furthermore, the device may comprise further components which are known by a person skilled in the art and which here are not described in detail. This in particular includes at least one cooling facility. In the case of down draw or overflow fusion methods, furthermore, a melting facility such as e.g. a melting crucible or a melting tank may be provided.

The method may comprise one or several postprocessing steps, in particular the trimming, cutting and/or finishing of the glass, for obtaining a flat glass with the desired properties.

Flat Glass

Below described features which are material properties of the glass do not only apply to the flat glass as a final product of the method, but also to the glass which is used in the method as a starting material. Preferably, the flat glass can be and/or is prepared by the method according to the present disclosure.

The disclosure includes a flat glass with at least two fire-polished surfaces and a relative TTV of less than $0.01-3*10^{-5}*(1/K)*(V_a-EW)+2.8*10^{-8}*(1/K^2)*(V_a-EW)^2$, wherein $V_a$ is the processing temperature and EW is the softening point.

Furthermore, the disclosure includes a flat glass with at least two fire-polished surfaces and a relative TTV of less than 0.01. Preferably, a difference between a processing point Va and a softening point EW of the glass is at least 50 K, in particular at least 100 K, at least 150 K or even at least 200 K. In particular, the mentioned difference is at most 500 K, preferably at most 450 K and particularly preferably at most 250 K or at most 150 K. It has been shown that with glasses with these properties flat glasses with the herein described advantageous properties, in particular the herein described TTV, can be obtained. In particularly preferable designs the flat glass is a glass ribbon, a glass pane or a glass wafer.

Preferably, the flat glass is a glass with a thickness of lower than 2 mm, in particular lower than 0.75 mm, lower than 0.5 mm or lower than 0.25 mm. In particularly preferable embodiments, the flat glasses have a thickness of not higher than 100 µm, not higher than 50 µm, not higher than 30 µm, not higher than 20 µm or not higher than 10 µm. In preferable embodiments the width of the flat glass is 10 to 1000 mm, in particular at least 50 mm, at least 100 mm or at least 200 mm. Preferably, it should not exceed a value of 800 mm, in particular 700 mm, 600 mm, 450 mm or 304.8 mm.

Preferable is a flat glass with a relative TTV of less than 0.009, less than 0.007 or less than 0.005. The relative TTV is measured by continuous thickness measurement of the thinned glass body in a 2 mm broad band in the center of the glass ribbon and is calculated for a section with a length of 160 mm each. The relative TTV is the TTV of such a 2 mm broad and 160 mm long section divided by its mean thickness. The mean thickness means the mean value of all thickness values measured for such a 2 mm broad and 160 mm long section. The TTV results from the difference of the maximum and minimum thickness values measured for such a 2 mm broad and 160 mm long section.

Preferably, the thickness values are measured in lanes orthogonally with respect to the drawing direction. Preferably, within each lane any millimeter one measuring value is recorded. Preferably, in the drawing direction, there is a distance between the lanes of 10 mm. Thus, preferably, in the case of the above described 2 mm broad and 160 mm long section two thickness values per lane are measured (preferably at a width position of the section of 0.5 mm and 1.5 mm). Preferably, 16 lanes are measured (preferably at a length position of the section of 5 mm, 15 mm, 25 mm, . . . , 155 mm). Thus, for a 2 mm broad and 160 mm long section preferably 2*16=32 thickness values are measured.

A "fire-polished surface" is a surface which is characterized by a particularly low roughness. With the production methods according to the present disclosure flat glasses with particular surface qualities can be produced. Due to the production methods with which they can be obtained, the flat glasses have at least one, in particular two fire-polished surfaces. In contrast to mechanic polishing in the case of fire-polishing a surface is not ground, but the material to be polished is heated to such a high temperature that it flows until being smooth. Therefore, the costs for the preparation of a smooth surface by fire-polishing are substantially lower than for the preparation of a mechanically polished surface. The roughness of a fire-polished surface is lower than the one of a mechanically polished surface. Based on the flat glass according to the present disclosure, "surfaces" mean the upper and/or lower sides, thus both faces which in comparison to the remaining faces are the largest ones.

The fire-polished surface(s) of the flat glasses of this disclosure, preferably, have a root-mean-squared roughness (Rq or also RMS) of at most 5 nm, preferably at most 3 nm and particularly preferably at most 1 nm. The roughness depth Rt of the flat glasses is preferably at most 6 nm, further preferably at most 4 nm and particularly preferably at most 2 nm. The roughness depth is determined according to DIN EN ISO 4287. According to the present disclosure, the roughness Ra is preferably less than 1 nm.

In the case of mechanically polished surfaces, the roughness values are worse. In addition, in the case of mechanically polished surfaces under the atomic force microscope (AFM) polishing traces can be seen. Furthermore, also under the AFM residuals of the mechanic polishing agent, such as diamond powder, iron oxide and/or $CeO_2$, can be seen. Since mechanically polished surfaces after the polishing step always have to be purified, certain ions at the surface of the glass are leached out. This depletion of certain ions can be detected with secondary ion mass spectrometry (ToF-SIMS). Such ions are for example Ca, Zn, Ba and alkali metals.

Preferably, the glass is selected from the group of silicate glasses, phosphate glasses, borate glasses, germanate glasses or chalcogenide glasses. Particularly preferable glasses are borosilicate glasses, alkali silicate glasses, alkaline-earth silicate glasses, aluminosilicate glasses, titanium silicate glasses, lanthanum borate glasses or fluorophosphate glasses. It is particularly preferable, when the glass is an optical glass, in particular a heavy flint glass, a colored glass or a borosilicate glass.

The disclosure includes a glass with
at least 20 and at most 85% by weight of $SiO_2$,
at least 3% by weight of alkali metal oxides,
at most 5% by weight of $Al_2O_3$,
at most 15% by weight of $B_2O_3$, and/or
at most 3% by weight of $ZrO_2$.

The disclosure includes a glass, comprising the following constituents

|  | preferable | more preferable |
| --- | --- | --- |
| $SiO_2$ | 20 to 50% by weight | 20 to 30% by weight |
| $Na_2O$ | 5 to 20% by weight | 8 to 15% by weight |
| $K_2O$ | 5 to 20% by weight | 8 to 15% by weight |
| CaO | 5 to 20% by weight | 8 to 15% by weight |
| BaO | 5 to 20% by weight | 8 to 15% by weight |
| $TiO_2$ | 20 to 50% by weight | 20 to 30% by weight |
| $ZrO_2$ | 0.1 to 3% by weight | 0.5 to 2% by weight |
| $Nb_2O_5$ | 3 to 10% by weight | 4 to 7% by weight |

Also, the disclosure includes a glass, comprising the following constituents

|  | preferable | more preferable |
| --- | --- | --- |
| $SiO_2$ | 60 to 85% by weight | 75 to 83% by weight |
| $B_2O_3$ | 10 to 20% by weight | 11 to 16% by weight |
| $Na_2O$ | 2 to 10% by weight | 3 to 6% by weight |
| $K_2O$ | 0.1 to 10% by weight | 0.25 to 2% by weight |
| $Al_2O_3$ | 0.1 to 10% by weight | 1 to 4% by weight |

In a preferable embodiment, the glass is a colored glass, in particular blue glass, which contains one or several staining components. Such staining components are in particular copper and cobalt.

A preferable colored glass comprises the following constituents

|  | preferable | more preferable |
| --- | --- | --- |
| $P_2O_5$ | 58 to 80% by weight | 58 to 68% by weight |
| $Al_2O_3$ | 4 to 20% by weight | 5 to 10% by weight |
| CuO | 1 to 20% by weight | 1 to 20% by weight |
| $SiO_2$ | 0 to 5% by weight | <2% by weight |
| F | <1% by weight | <1% by weight |
| $\Sigma RO$ | 0 to 18% by weight | 0 to 11% by weight |
| $\Sigma R_2O$ | >2 to 17% by weight | 3 to 17% by weight |
| $V_2O_5$ |  | >0% by weight |

$\Sigma RO$ is the sum of the alkaline-earth oxides and ZnO. $\Sigma R_2O$ is the sum of the alkali metal oxides.

In a preferable embodiment, the colored glass is a fluorine-containing colored glass, in particular comprising the following constituents.

| $P_2O_5$ | 25 to 75% by weight |
| --- | --- |
| $Al_2O_3$ | 0.5 to 15% by weight |
| CuO | 1 to 20% by weight |
| $F/F_2$ | 1 to 30% by weight |
| $\Sigma RO$ | 0 to 40% by weight |
| $\Sigma R_2O$ | 0.5 to 20% by weight |

Due to the toxicity and ecological harm of the following components, the glass is preferably free of Pb, Cd, Ni and As.

When in this description is mentioned that the glasses are free of a component or that they do not contain a certain component, then this means that it is only allowed for this component to be present in the glasses as an impurity. This means that it is not contained in substantial amounts and/or that it is not added to the glass as a glass component. According to the present disclosure, not substantial amounts are amounts of less than 1000 ppm, preferably less than 500 ppm and most preferably less than 100 ppm. Preferably, the glasses are also free of components which are not mentioned in this description as a glass constituent. According to a preferable embodiment, the glass consists preferably of at least 90% by weight, further preferably at least 95% by weight, further preferably at least 97.5% by weight, further preferably at least 99% by weight, further preferably at least 99.5% by weight, still further preferably at least 99.9% by weight of the components which are mentioned herein.

EXAMPLES

Example 1 (Comparative Example)

In a redrawing unit, a flat glass preform made of a heavy flint glass (NSF6) with the dimensions 1650 mm×340 mm×14 mm is redrawn to a thickness in the center region of 300 μm. The glass was of the following composition: $SiO_2$ 25% by weight, $Na_2O$ 10% by weight, $K_2O$ 10% by weight, CaO 10% by weight, BaO 10% by weight, $TiO_2$ 25% by weight, $ZrO_2$ 1% by weight, $Nb_2O_5$ 5% by weight.

The redrawing unit is provided with a heating and cooling facility which results in a short deforming zone so that the width loss of the ribbon is lower than 80 mm. The heating facility consists of two parallel SiC tubes, the cooling facilities consist of furnace installations through which a coolant flows. Between the SiC tubes and besides the deforming zone of the glass, fast thermocouple elements for measuring the current temperature are arranged. The temperature of the heating SiC rods is adjusted such that for drawing at the glass body a force of 5-40 N is necessary. The temperatures at the thermocouple elements as well as the thickness of the glass in the net region are measured in a time-dependent manner. The fluctuations of the temperature show an interquartile range of 5.6 K.

FIGS. 5A to 5D show the interquartile range of the temperature in the hot forming zone measured during the method according to the present disclosure for the examples 1-3. Here, the upper curve shows the time-dependent course of the temperature with the faceplate of example 3; the curve in the middle shows the time-dependent course of the temperature in example 2 and the lower curve shows the time-dependent course of the temperature in example 1. On the right side, the frequencies of the measured temperatures are shown. The width of the distribution reflects the fluctuation of the temperature values.

The thickness profiles measured during the experiments are evaluated with respect to the fluctuation in the drawing direction by analyzing the TTV of 2 mm broad and 160 mm long bands. The relative TTV is the quotient of the current TTV in μm and the mean thickness in the net region. In example 1, this results in a relative TTV of 0.015.

Example 2 (Comparative Example)

Furnace Faceplate without Preform Contact

In a redrawing unit, a flat glass preform made of a heavy flint glass (NSF6) with the dimensions 1650 mm×340 mm×14 mm is redrawn to a thickness in the center region of 300 μm. The glass was of the following composition: $SiO_2$ 25% by weight, $Na_2O$ 10% by weight, $K_2O$ 10% by weight, CaO 10% by weight, BaO 10% by weight, $TiO_2$ 25% by weight, $ZrO_2$ 1% by weight, $Nb_2O_5$ 5% by weight.

The redrawing unit is provided with a heating and cooling facility which results in a short deforming zone so that the width loss of the ribbon is lower than 80 mm. The heating facility consists of two parallel SiC tubes, the cooling facilities consist of furnace installations through which a coolant flows. Between the SiC tubes and besides the deforming zone of the glass, fast thermocouple elements for measuring the current temperature are arranged. Between the deforming zone and the preheating zone, a faceplate which is connected with the furnace and which provides a slit of 3 mm with respect to the preform is installed. The temperature of the heating SiC rods is adjusted such that for drawing at the glass ribbon a force of 5-40 N is necessary. The temperatures at the thermocouple elements as well as the thickness of the glass in the net region are measured in a time-dependent manner. The fluctuations of the temperature show an interquartile range (IQA) of 2.15 K (see FIGS. 5A-D).

The thickness profiles measured during the experiments are evaluated with respect to the fluctuation in the drawing direction by analyzing the TTV of 2 mm broad and 160 mm long bands. The relative TTV is the quotient of the current TTV in μm and the mean thickness in the net region. In this example, a relative TTV of 0.011 results.

Example 3

Furnace Faceplate with Preform Contact

In a redrawing unit a flat glass preform made of a heavy flint glass (NSF6) with the dimensions 1650 mm×340 mm×14 mm is redrawn to a thickness in the center region of 300 μm. The glass was of the following composition: $SiO_2$ 25% by weight, $Na_2O$ 10% by weight, $K_2O$ 10% by weight, CaO 10% by weight, BaO 10% by weight, $TiO_2$ 25% by weight, $ZrO_2$ 1% by weight, $Nb_2O_5$ 5% by weight.

The redrawing unit is provided with a heating and cooling facility which results in a short deforming zone so that the width loss of the ribbon is lower than 80 mm. The heating facility consists of two parallel SiC tubes, the cooling facilities consist of furnace installations through which a coolant flows. Between the SiC tubes and besides the deforming zone of the glass, fast thermocouple elements for measuring the current temperature are arranged. Between the deforming zone and the preheating zone, a buoyant faceplate made of hexagonal boron nitride is installed which touches the preform in the edge region with guide noses (contact sections) and which thus is able to position itself with respect to the preform so that outside the touching zones between the glass body and the distance sections a slit size of 1.5 mm with respect to the preform is not exceeded. The temperature of the heating SiC rods is adjusted such that for drawing at the glass ribbon a force of 5-40 N is necessary. The temperatures at the thermocouple elements as well as the thickness of the glass in the net region are measured in a time-dependent manner. The fluctuations of the temperature show an interquartile range (IQA) of 0.9 K (see FIGS. 5A-D).

The thickness profiles measured during the experiments are evaluated with respect to the fluctuation in the drawing direction by analyzing the TTV of 2 mm broad and 160 mm long bands. The relative TTV is the quotient of the current TTV in μm and the mean thickness in the net region. In this example, a relative TTV of 0.0085 results.

Example 4

Furnace Faceplate with Preform Contact, Cylindrical Elements

In a redrawing unit, a flat glass preform made of a heavy flint glass (NSF6) with the dimensions 1650 mm×340 mm×14 mm is redrawn to a thickness in the center region of 300 μm. The glass was of the following composition: $SiO_2$ 25% by weight, $Na_2O$ 10% by weight, $K_2O$ 10% by weight, CaO 10% by weight, BaO 10% by weight, $TiO_2$ 25% by weight, $ZrO_2$ 1% by weight, $Nb_2O_5$ 5% by weight.

The redrawing unit is provided with a heating and cooling facility which results in a short deforming zone so that the width loss of the ribbon is lower than 80 mm. The heating facility consists of two parallel SiC tubes, the cooling facilities consist of furnace installations through which a coolant flows. Between the SiC tubes and besides the deforming zone of the glass, fast thermocouple elements for measuring the current temperature are arranged. Between the deforming zone and the preheating zone, a faceplate according to FIG. 4 is installed which provides a slit of 0.5 mm with respect to the glass body. The temperature of the heating SiC rods is adjusted such that for drawing at the glass ribbon a force of 5-40 N is necessary. The temperatures at the thermocouple elements as well as the thickness of the glass in the net region are measured in a time-dependent manner. The fluctuations of the temperature show an interquartile range of 0.5 K.

The thickness profiles measured during the experiments are evaluated with respect to the fluctuation in the drawing direction by analyzing the TTV of 2 mm broad and 160 mm long bands. The relative TTV is the quotient of the current TTV in μm and the mean thickness in the net region. In this example, a relative TTV of 0.0063 results.

Example 5

Furnace Faceplate with Preform Contact

In a redrawing unit, a flat glass preform made of borosilicate glass (Borofloat) with the dimensions 1650 mm×340 mm×14 mm is redrawn to a thickness in the center region of 170 μm. The glass was of the following composition: $SiO_2$ 80% by weight, $B_2O_3$ 12.5% by weight, $Na_2O$ 4% by weight, $K_2O$ 0.5% by weight, $Al_2O_3$ 2% by weight.

The redrawing unit is provided with a heating and cooling facility which results in a short deforming zone so that the width loss of the ribbon is lower than 80 mm. The heating facility consists of two parallel SiC tubes, the cooling facilities consist of furnace installations through which a coolant flows. Between the SiC tubes and besides the deforming zone of the glass, fast thermocouple elements for measuring the current temperature are arranged. Between the deforming zone and the preheating zone, a buoyant faceplate made of hexagonal boron nitride is installed which touches the preform in the edge region with guide noses and which thus is able to position itself with respect to the preform so that outside the touching zones a slit size of 1.5 mm with respect to the preform is not exceeded. The temperature of the heating SiC rods is adjusted such that for drawing at the glass ribbon a force of 5-40 N is necessary. The temperatures at the thermocouple elements as well as the thickness of the glass in the net region are measured in a time-dependent manner. The fluctuations of the temperature show an interquartile range (IQA) of 0.9 K.

The thickness profiles measured during the experiments are evaluated with respect to the fluctuation in the drawing direction by analyzing the TTV of 2 mm broad and 160 mm long bands. The relative TTV is the quotient of the current TTV in μm and the mean thickness in the net region. In this example, a relative TTV of 0.0041 results.

Example 6

Furnace Faceplate with Preform Contact

In a redrawing unit, a flat glass preform made of a blue glass (BG 66) with the dimensions 800 mm×200 mm×14 mm is redrawn to a thickness in the center region of 110 μm.

The redrawing unit is provided with a heating and cooling facility which results in a short deforming zone so that the width loss of the ribbon is lower than 80 mm. The heating facility consists of two parallel SiC tubes, the cooling facilities consist of furnace installations through which a coolant flows. Between the SiC tubes and besides the deforming zone of the glass, fast thermocouple elements for measuring the current temperature are arranged. Between the deforming zone and the preheating zone, a buoyant faceplate made of hexagonal boron nitride is installed which touches the preform in the edge region with guide noses and which thus is able to position itself with respect to the preform so that outside the touching zones a slit size of 1.5 mm with respect to the preform is not exceeded. The temperature of the heating SiC rods is adjusted such that for drawing at the glass body a force of 5-40 N is necessary. The temperatures at the thermocouple elements as well as the thickness of the glass in the net region are measured in a time-dependent manner. The fluctuations of the temperature show an interquartile range (IQA) of 0.9 K (see FIGS. 5A-D).

The thickness profiles measured during the experiments are evaluated with respect to the fluctuation in the drawing direction by analyzing the TTV of 2 mm broad and 160 mm long bands. The relative TTV is the quotient of the current TTV in μm and the mean thickness in the net region. In this example, a relative TTV of 0.0094 results.

Example 7

Furnace Faceplate with Preform Contact

In a redrawing unit, a flat glass preform made of soda-lime float glass with the dimensions 1650 mm×400 mm×8 mm is redrawn to a thickness in the center region of 200 μm. The glass was of the following composition: $SiO_2$ 71.7% by weight, $Al_2O_3$ 1.2% by weight, $Fe_2O_3$ 0.2% by weight, $TiO_2$ 0.1% by weight, $SO_3$ 0.4% by weight, CaO 6.7% by weight, MgO 4.2% by weight, $Na_2O$ 15% by weight, $K_2O$ 0.4% by weight.

The redrawing unit is provided with a heating and cooling facility which results in a short deforming zone so that the width loss of the ribbon is lower than 80 mm. The heating facility consists of two parallel SiC tubes, the cooling facilities consist of furnace installations through which a coolant flows. Between the SiC tubes and besides the deforming zone of the glass, fast thermocouple elements for measuring the current temperature are arranged. Between the deforming zone and the preheating zone, a buoyant faceplate made of hexagonal boron nitride is installed which touches the preform in the edge region with guide noses and which thus is able to position itself with respect to the preform so that outside the touching zones a slit size of 1.5 mm with respect to the preform is not exceeded. The temperature of the heating SiC rods is adjusted such that for drawing at the glass body a force of 5-40 N is necessary. The temperatures at the thermocouple elements as well as the thickness of the glass in the net region are measured in a time-dependent manner. The fluctuations of the temperature show an interquartile range (IQA) of 0.9 K (see FIGS. 5A-D).

The thickness profiles measured during the experiments are evaluated with respect to the fluctuation in the drawing direction by analyzing the TTV of 2 mm broad and 160 mm long bands. The relative TTV is the quotient of the current TTV in μm and the mean thickness in the net region. In this example, a relative TTV of 0.0051 results.

Example 8

Furnace Faceplate with Preform Contact

In a redrawing unit a flat glass preform made of a blue glass (BG 56) with the dimensions 800 mm×200 mm×14 mm is redrawn to a thickness in the center region of 110 μm. The glass was of the following composition: $P_2O_5$ 68% by weight, $Al_2O_3$ 7% by weight, $Li_2O$ 1% by weight, $Na_2O$ 5% by weight, $K_2O$ 6% by weight, MgO 4% by weight, $La_2O_3$ 2% by weight, CuO 6% by weight, $V_2O_5$ 1% by weight.

The redrawing unit is provided with a heating and cooling facility which results in a short deforming zone so that the width loss of the ribbon is lower than 80 mm. The heating facility consists of two parallel SiC tubes, the cooling facilities consist of furnace installations through which a coolant flows. Between the SiC tubes and besides the deforming zone of the glass, fast thermocouple elements for measuring the current temperature are arranged. Between the deforming zone and the preheating zone, a buoyant faceplate made of hexagonal boron nitride is installed which touches the preform in the edge region with guide noses and which thus is able to position itself with respect to the preform so that outside the touching zones a slit size of 1.5 mm with respect to the preform is not exceeded. The temperature of the heating SiC rods is adjusted such that for drawing at the glass body a force of 5-40 N is necessary. The temperatures at the thermocouple elements as well as the thickness of the glass in the net region are measured in a time-dependent manner. The fluctuations of the temperature show an interquartile range (IQA) of 0.9 K (see FIGS. 5A-D).

The thickness profiles measured during the experiments are evaluated with respect to the fluctuation in the drawing direction by analyzing the TTV of 2 mm broad and 160 mm long bands. The relative TTV is the quotient of the current TTV in μm and the mean thickness in the net region. In this example a relative TTV of 0.0088 results.

Discussion of the Examples

It is shown that with a decreasing interquartile range of the temperature also the medians of the TTV values decrease. Thus, it is particularly advantageous to realize a slit distance which is as small as possible. The optical glass used has a processing point $V_a$ (viscosity $10^4$ dPas) of 817° C. and a softening point EW ($10^{7.6}$ dPas) of 681° C. The Borofloat glass used has a processing point $V_a$ (viscosity $10^4$ dPas) of 1270° C. and a softening point EW ($10^{7.6}$ dPas) of 820° C.

The following table again summarizes the results:

| Experiment | $V_a$ [° C.] | EW [° C.] | $V_a$ − EW [K] | $IQA_{temperature}$ [K] | rel. TTV |
|---|---|---|---|---|---|
| Example 1 | 817 | 681 | 136 | 5.6 | 0.015 |
| Example 2 | 817 | 681 | 136 | 2.15 | 0.0113 |
| Example 3 | 817 | 681 | 136 | 0.9 | 0.0085 |
| Example 4 | 817 | 681 | 136 | 0.5 | 0.0063 |
| Example 5 | 1270 | 820 | 450 | 0.9 | 0.0041 |
| Example 6 | 596 | 496 | 100 | 0.9 | 0.0095 |
| Example 7 | 1030 | 695 | 335 | 0.9 | 0.0051 |
| Example 8 | 610 | 490 | 120 | 0.9 | 0.0088 |

Thus, according to the present disclosure, relative TTVs of <0.01 are achieved. In particular, the disclosure allows the achievement of a relative TTV of <0.01 for glasses with a difference between EW and $V_a$ of <500 K or <450 K or <150 K. The smaller the difference between $V_a$ and EW, the steeper the glass, i.e. the steeper is the slope of the viscosity curve and the more sensitive is the TTV in the case of temperature fluctuations.

When the rel. TTV versus ($V_a$−EW) is plotted (FIGS. 6, 7, 8), then it can be seen that with the buoyant faceplate a relative TTV which is smaller than $0.01-3*10^{-5}*(1/K)*(V_a-EW)+2.8*10^{-8}*(1/K^2)*(V_a-EW)^2$ is achieved.

Figure 6:
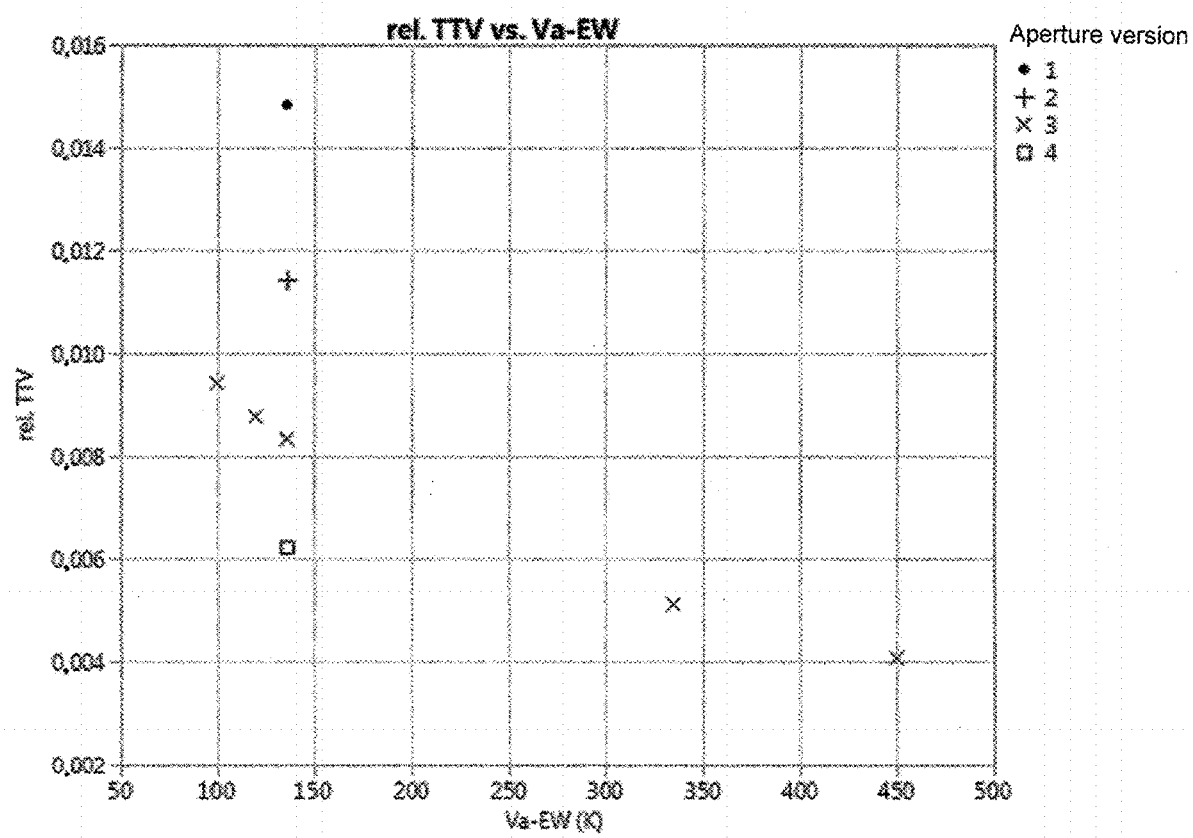
FIG. 6 shows the relative TTV achieved in experiments in relation to the difference between the processing temperature and the softening point.

FIG. 6 shows the relative TTV as a function of the difference between the processing temperature Va and the softening point EW of a glass. It can be seen that it is easier to achieve an optimum result with respect to the relative TTV, when the mentioned difference is higher, i.e. when the glass is "longer". But it can also be seen that in the case of a given glass the kind of the faceplate has a critical influence onto the relative TTV which can be achieved.

Figure 7:
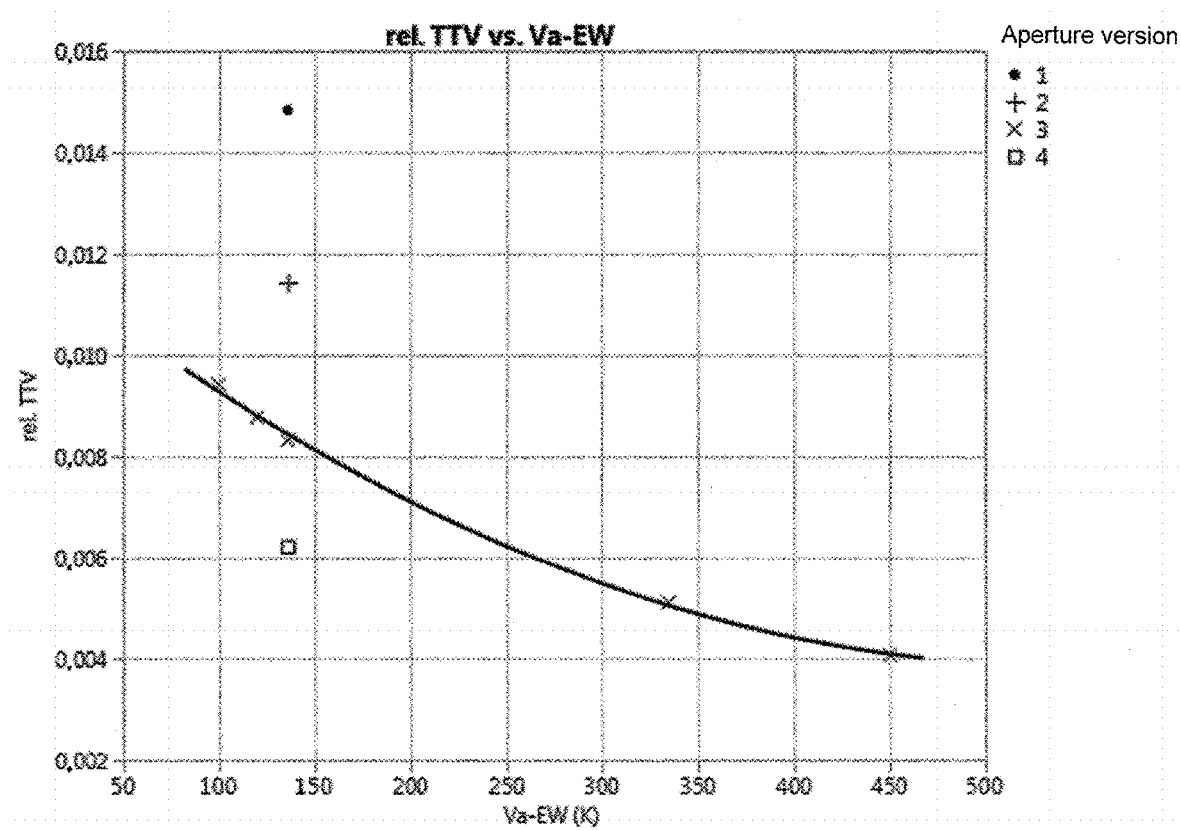
FIG. 7 shows the relative TTV achieved in experiments in relation to the difference between the processing temperature and the softening point.
Figure 8:
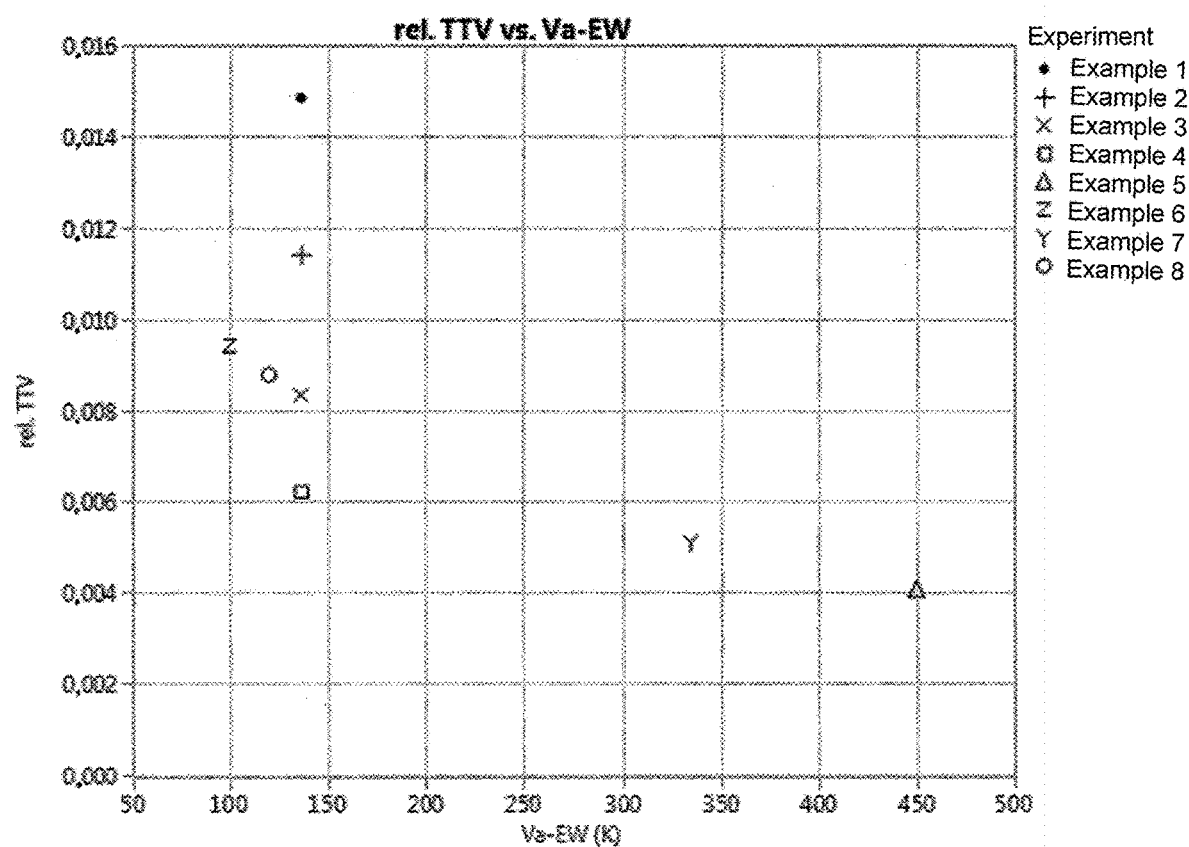
FIG. 8 shows the relative TTV achieved in experiments in relation to the difference between the processing temperature and the softening point.

FIG. 7 shows the graph of the equation which characterizes flat glasses according to the present disclosure. Values above the graph are achieved with faceplates of prior art, values below with solutions according to the present disclosure.

FIG. 8 again shows the relative TTV as a function of the difference between the processing temperature and the softening point and as a function of the faceplate version, here with reference to the examples shown herein.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

LIST OF REFERENCE SIGNS 1 glass ribbon
2 faceplate
3 contact section
4 slit
5 base plate
6 hot forming zone
7 cover plate
8 thermocouple element
9 cylindrical element
10 support
11 contact sections of a cylindrical element

What is claimed is:

1. A method for the production of a flat glass surfaces, comprising the steps of:
passing a glass through a forming device that has a first region, wherein the glass has four sides, wherein the glass is at a transformation temperature Tg of the glass at a viscosity of $10^{13}$ dPas while the glass is in the first region;
passing the glass through a second region of the forming device, wherein the glass is at a temperature that is within a temperature range that encompasses a processing temperature $V_a$ of the glass and has a viscosity of $10^4$ dPas while the glass is in the second region; and
passing the glass through a faceplate of the forming device,
wherein the faceplate is between the first region and the second region,
wherein the faceplate thermally separates the first region and the second region,
wherein the faceplate comprises distance sections and contact sections,
wherein the-contact sections comprise projections that contact the glass on at least one point on each of at least two sides of the glass, and
wherein the distance sections do not contact the glass so that a slit with a width of at most 5 mm is formed between the glass and the distance sections of the faceplate as the glass is passed through the faceplate.

2. The method according to claim 1, wherein the method is a redrawing method, a down draw or overflow fusion method.

3. The method according to claim 1, wherein the forming device further comprises a housing, wherein the housing comprises a glass outlet opening and a glass inlet opening, and the faceplate is at the glass outlet opening or the glass inlet opening.

4. The method according to claim 1, wherein the temperature of the glass in the second region has a temperature range that varies by an interquartile range of less than 2 K.

5. The method according to claim 3, wherein the faceplate is moveable relative to the housing.

* * * * *